United States Patent Office 3,298,754
Patented Jan. 17, 1967

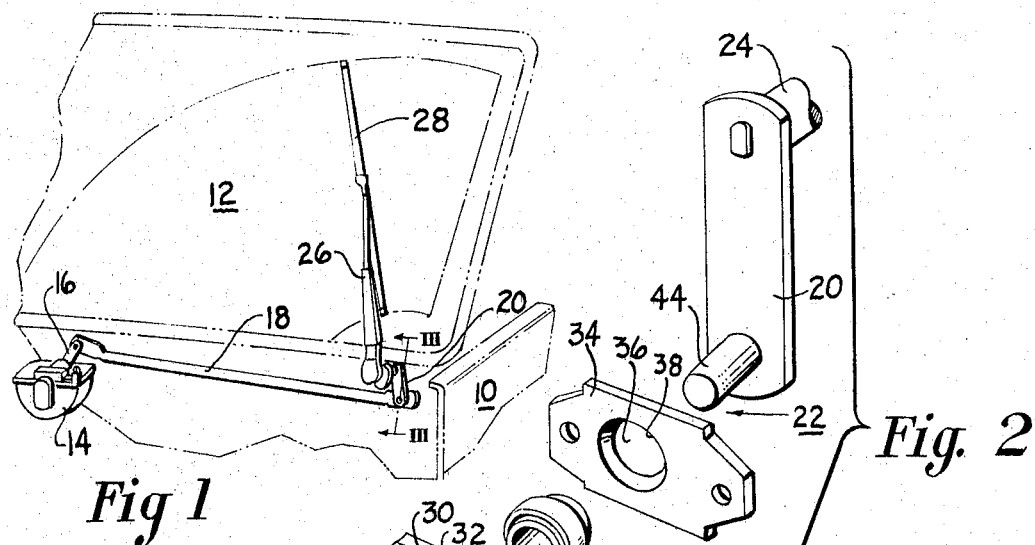
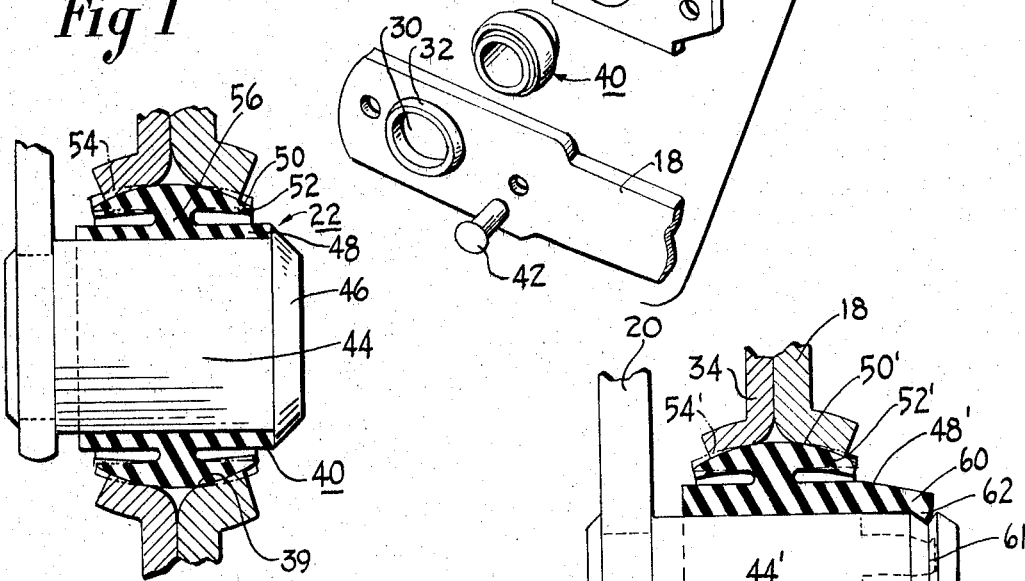
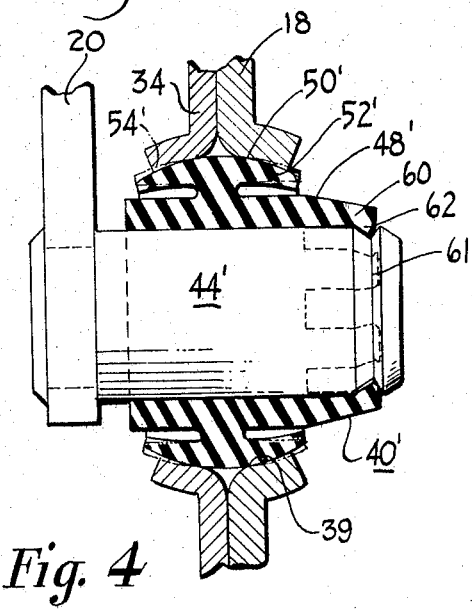
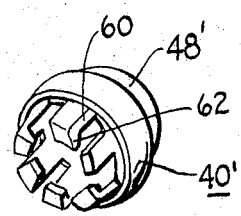

3,298,754
SELF-ALIGNING BEARING ASSEMBLY FOR WINDSHIELD WIPER MECHANISM
William C. Riester, Williamsville, N.Y., assignor to Trico Products Corporation, Buffalo, N.Y.
Filed Dec. 21, 1962, Ser. No. 246,481
6 Claims. (Cl. 308—72)

The present invention relates to improved windshield wiper linkage for an automotive vehicle, and more particularly to an improved ball and socket joint for pivotally connecting levers of a linkage system.

In windshield wiper linkage installations, ball and socket joints are used for coupling link elements which move relative to each other and in which the orientation of the longitudinal axis of rotation changes during a cycle of operation. After a substantial duration of operation, the bearings in such a joint may begin to wear and the joint may become relatively loose. This looseness results in an increased noise. Since the linkage generally operates in a resonant chamber which is behind the vehicle dashboard, it is desirable that the linkage operate quietly and smoothly so that it does not generate noise which can be magnified by the resonant chamber to the annoyance and distraction of occupants of the vehicle. Furthermore, since the linkage is located in a relatively inaccessible position for service, an installation should be provided which gives long life without requiring servicing. To obtain long service-free life of a ball and socket joint, it would be advantageous to provide a bearing which is self-compensating for wear. Prior art ball and socket joints which are self-compensating for wear have employed multi-part bearings with interposed springs or complex bearing seat structure including spring plates. These constructions involved additional manufacturing and assembly operations with consequent additional cost, as well as additional wear points.

Another desirable feature in a ball and socket or swivel joint is simplicity and ease of disassembly for removal and repair. This has been a problem in certain previous constructions, particularly in the above-mentioned complex self-compensating bearings.

In normal operation of a windshield wiper, the linkage joints have forces applied to them which include an axial component, tending to shift the pivot shaft axially. This axial shifting of the pivot shaft may create noise and cause additional wear. Thus is it desirable to provide a ball and socket joint which precludes axial displacement of the pivot shaft.

The principal object of the present invention is to provide a ball and socket joint for connecting a pair of links which are movable relative to each other that is economical to manufacture, self-compensating for wear, and relatively silent.

Another object of the present invention is to provide an improved ball and socket joint for connecting a pair of relatively movable linkages which prevents axial shifting of the pivot shaft and facilitates removal for servicing and replacement of parts.

A further object of the invention is to provide an improved ball and socket joint which includes a bearing compressibly retained in its seat and stressed so that upon normal wear of the bearing surface, the bearing will expand into the seat to adjust for the wear.

A still further object of the invention is to provide an improved double-walled bearing wherein the distance between the walls can be large enough to facilitate manufacturing and to render the bearing economical to manufacture.

Other objects and advantages of the invention will be apparent from the following detailed description taken in connection with the accompanying drawings in which:

FIG. 1 is a fragmentary perspective view of a motor vehicle illustrating the linkage of this invention embodied in windshield cleaning apparatus;

FIG. 2 is an enlarged, exploded perspective view showing the ball and socket joint of this invention;

FIG. 3 is an enlarged view partly in cross section on line III—III of FIG. 1;

FIG. 4 is a view similar to FIG. 3 showing a modified embodiment of the invention; and FIG. 5 is a perspective view of the bearing employed in the FIG. 4 modification.

Although the novel ball and socket joint is shown and described herein for use with windshield wiper linkage, it will, of course, be understood that in accordance with the broader aspects of the invention, this novel construction may be applied to any pair of levers connected for pivotal movement relative to each other. This invention is particularly applicable to windshield wiper linkage installations and the like since the problems which are sought to be solved are particularly apparent in this type of linkage.

Briefly, the invention comprises a ball and socket joint which includes a bearing seat having a curvilinear surface as, for example, a spherical surface and a double-walled bearing in which the inner surface of the inner wall is cylindrical to accommodate a pivot or stud and in which the outer surface of the outer wall is curvilinear, but has a radius of curvature greater than the radius of curvature of the bearing seat in longitudinal cross section. The outer wall of the bearing is deformed and compressed by the bearing seat to conform the outer surface of the bearing to the bearing seat. These two surfaces may, but in accordance with the broader aspects of the invention, need not be coincident in their assembled position. Annular line contact between the outer surface of the outer wall of the bearing and the bearing seat is sufficient. The outer wall of the bearing is resilient and, as shown, is connected to and spaced from the inner wall of the bearing by an annular neck portion intermediate the ends of the inner and outer walls. The entire bearing is preferably molded of resilient plastic material having anti-friction characteristics.

Referring now in detail to the drawings, in FIG. 1 there is shown an automotive vehicle 10 having a windshield 12 mounted thereon in the conventional manner. A wiper motor 14 is suitably mounted on the wall of a chamber below the cowl of the vehicle and has an output lever or motor crankarm 16 rigidly affixed to the motor output shaft. Although the wiper motor shown is of the vacuum type, it will be understood that any suitable type of motor may be employed, such as a hydraulic or electric type motor. The drive lever or motor crankarm 16 is pivotally connected to one end of an elongated torque transmitting driving link element 18. The opposite end of the link element 18 is coupled to the wiper pivot shaft driving lever 20 by ball and socket joint 22 (FIG. 2). Wiper pivot shaft driving lever 20 is secured to an end of rockshaft 24 which is suitably journaled for rotation in bearings in the cowl of the vehicle and has a wiper arm 26 mounted on the other end thereof. The wiper arm in turn carries a wiper 28. A similar linkage and construction is secured to and driven by the other end of the motor crankarm 16 for driving a wiper blade and arm on the opposite side of the windshield not shown in FIG. 1. It will readily be appreciated that whenever wiper motor 14 is placed in operation, the motion produced by the wiper motor is transmitted to the wipers 28 through the above described linkage for causing the wiper to oscillate back and forth across the windshield to clear moisture therefrom.

One embodiment of the ball and socket joint of this invention is clearly illustrated in FIGS. 2 and 3. The end of driving link 18 which is connected to lever 20 has an opening 30. An annular rim 32 having a spherical inner surface surrounds opening 30 and forms one-half of a bearing seat for a ball and socket joint. A backing plate 34 is provided with an opening 36 having an annular rim 38 complementary to the annular rim 32 circumscribing opening 30 of link 18. The rim 38 has an inner surface of suitable curvilinear configuration as, for example, spherical as shown to form the other half of a bearing seat for a ball and socket joint. In assembled position the inner surfaces or rims 32 and 38 form the socket or bearing seat 39 of the ball and socket joint. Although shown as spherical, any suitable curvilinear surface will suffice. The bearing 40, which constitutes the ball of the ball and socket joint, is disposed intermediate the link 18 and the backing plate 34 and has an outer curvilinear surface which is received by the bearing seat halves 32 and 38. The backing plate 34 is secured to the link 18 as by rivets 42 or in any other suitable manner. The lever 20 has a stud or pivot shaft 44 projecting therefrom which is rotatably journaled in an axial opening in the bearing 40 which has an inner cylindrical bearing surface. As shown in FIG. 3, the stud is maintained against longitudinal displacement by peening or offsetting the end of the stud as at 46 after assembly. Other suitable or desirable means may be employed for preventing longitudinal displacement as, for example, a spring clip or a retaining ring and groove.

The bearing 40 is a double-walled bearing and may be of integral molded construction of suitable resilient plastic material having suitable anti-friction characteristics as, for example, thermo-setting or thermo-plastic resinous material. However, in the broadest aspects of the invention, any suitable resilient material having anti-friction characteristics may be used. The inner wall 48 may be a hollow cylinder. The outer wall 52 has an outer surface 50 of curvilinear configuration. In longitudinal cross section, the outer surface 50 of the outer wall may have a radius of curvature greater than the radius of curvature of the bearing seat 39. For example, assume that the bearing seat 39 in longitudinal cross section constitutes a pair of segments of a circle having its center at the intersection of the transverse and longitudinal center lines of the bearing seat 39, thus forming a spherical bearing seat; then diametrically opposite lines on the outer surface 50 of the outer wall 52 of the bearing 40 in longitudinal cross section in its unassembled and unstressed condition each constitute a segment of a circle having its center at the intersection of the transverse center line of the bearing seat and an axial line displaced from the longitudinal center line an equal distance toward the opposite segment. The shape of the outer surface 50 is shown in FIG. 3 by dotted line 54. The inner and outer walls are connected by an annular neck portion 56 which is disposed centrally intermediate the ends of the inner wall 48 and the outer wall 52.

When the bearing is assembled and seated between seat halves 32 and 38, the seat 39 compresses and deforms the outer wall of the bearing and, because of the resiliency of the outer wall, it conforms substantially to the spherical shape of the bearing seat. Since the outer wall 52 of the bearing 40 is deformed in compression, it is biased against the bearing seat and as bearing wear occurs on the outer surface 50 of the outer wall, the bearing tends to expand into the bearing seat, thus resulting in a bearing surface which is self-compensating for wear. In accordance with the broader aspects of the invention, the seat may take other curvilinear shapes resulting in annular line contact between the outer surface 50 of the outer wall 52 and the bearing seat 39 along one or more parallel annular lines.

When the wiper motor is operating, forces are applied at the bearing which causes the stud or pivot shaft 44 to oscillate on its longitudinal axis within the inner wall 48 and other forces are applied which have vertical and longitudinal components which tend to angularly displace the longitudinal axis of the stud 44. In the latter case, the outer surface 50 of the outer wall 52 moves relative to the bearing seat. In a broader aspect of the invention, the inner wall 48 may be rigidly secured to a shaft for rotation therewith when it is desired to employ the bearing in a simple ball and socket joint rather than a compound joint which includes a pivotal shaft. In this form the inner wall 48 and associated shaft form a core for the bearing.

In FIGS. 4 and 5 there is shown a modification of the invention in which a novel construction is provided for preventing longitudinal displacement of the pivot shaft which also facilitates removal for repair and replacement. In the modification of the invention shown in FIGS. 4 and 5 the construction of the linkage and the bearing seat 39 is identical to that described above with reference to FIGS. 2 and 3. Only that portion of the ball and socket assembly which differs from that shown in FIGS. 2 and 3 will be described in order to avoid unnecessary description. Identical elements in FIGS. 3 and 4 will be identified by the same reference numerals. The bearing 40′ includes an outer wall 52′ having an outer surface 50′ identical to the construction shown in FIG. 3. The difference resides in the construction of the inner wall and the means for securing the stud or pivot shaft 44′ against longitudinal movement within the bearing. The stud 44′ has a substantially V-shaped groove 61 at its free end. A plurality of longitudinally extending circumferentially spaced fingers 60 project from the end of the inner wall 48′ of the bearing 40′ and have radially inward extending projections 62 which are complementary in shape with the groove 61 at the free end of the shaft 44′. When the stud 44′ is assembled in the bearing 40′, the projections 62 engage the groove 61 to retain the stud against axial displacement. In all other respects, the modification shown in FIGS. 4 and 5 is identical with the FIGS. 2 and 3 modification.

To disassemble the pivot shaft or stud 44′ from the bearing 40′, it is merely necessary to insert a wedge or like tool between the driving lever 20 and the adjacent end of the bearing 40′. Because the groove 61 is V-shaped and presents an inclined surface to the projections 62, the shaft 44′ can be easily removed in this manner. However, in normal operation, the pivot shaft 44′ is securely held against accidental removal from the bearing 40′ because the angle between a horizontal plane and the inclined surface is large enough to prevent such accidental removal, as can clearly be seen in FIG. 4 of the drawings.

It should now be apparent that a novel and improved ball and socket joint has been shown and described which is economical to manufacture, facilitates assembly and disassembly, which is relatively noise free and which is self-compensating for wear. Another advantageous feature of the disclosed bearing is the simplification of molding derived from its unique construction whereby the bearing seat 39 and the outer bearing surface 50 have different radii. Because of the compression of the outer wall during assembly, wide spacing can be provided during molding of the bearing between the inner and outer walls while, at the same time, maintaining substantial thickness of the inner and outer walls. If the bearing was designed to be initially molded in its final shape, either the bearing walls 48 and 52 would have to be unsuitably thin or the radial distance between the bearing walls 48 and 52 would have to be extremely narrow. To provide a plug in a molding operation for molding a narrow slot between the walls is impractical from a manufacturing point of view and would involve additional expense in the molding process. Thus this unique construction enables the improved bearing to be manufactured without incurring such additional expense.

Although certain specific embodiments of the invention have been described for the purpose of illustration, it will be apparent that various modifications and other embodiments are possible within the scope of the invention. For example, the bearing seat need not necessarily be spherical, but within the broader aspects of the invention may be formed in other suitable shapes. In its broadest aspects, the ball and socket assembly may be employed in applications other than windshield wiper linkages and may be employed with other and different types of windshield wiper linkages. It is to be understood, therefore, that the invention is not limited to the specific arrangement shown, but in its broadest aspects it includes all equivalent embodiments and modifications which come within the scope of the invention.

What is claimed is:

1. A ball joint assembly comprising a bearing housing having a bearing retaining seat of substantially spherical configuration, a double-walled bearing including an inner wall having an inner cylindrical bearing surface, an outer wall having a curvilinear outer bearing surface of greater radius of curvature than said bearing retaining seat when unassembled, means for spacing and connecting said inner wall and said outer wall, said bearing being received in said bearing seat with said outer wall being deformed in compression to resiliently engage said bearing seat whereby said outer bearing surface of said outer wall resiliently engages said bearing seat for movement therein.

2. A ball joint assembly comprising a bearing housing having a bearing retaining seat of substantially spherical configuration, a double-walled bearing including an inner wall having an inner cylindrical bearing surface, an outer wall having a curvilinear outer bearing surface of greater radius of curvature than said bearing retaining seat when unassembled, annular means for spacing and connecting said inner wall and said outer wall, said bearing being received in said bearing seat with said outer wall being deformed in compression whereby said outer bearing surface of said outer wall resiliently engages said bearing seat for movement therein.

3. A ball joint assembly comprising a bearing housing having a bearing retaining seat of substantially spherical configuration, a double-walled bearing including an inner wall having an inner cylindrical bearing surface, an outer wall having a curvilinear outer bearing surface of greater radius of curvature than said bearing retaining seat when unassembled, annular means intermediate the ends of said inner and outer walls for spacing and connecting said inner wall and said outer wall, said bearing being received in said bearing seat with said outer wall being deformed in compression whereby said outer bearing surfaces of said outer wall resiliently engages said bearing seat for movement therein.

4. A ball joint assembly comprising a bearing housing having a bearing retaining seat of curvilinear configuration, a double-walled bearing including an inner wall having an inner bearing surface, a shaft journaled for rotation within said inner bearing surface, an outer resilient wall spaced from said inner wall having an outer surface of curvilinear configuration, said outer surface having a larger radius of curvature in longitudinal cross section than said bearing seat, said outer wall being flexibly receivable in said bearing seat for movement relative thereto and being deformed in compression when seated in said bearing seat.

5. A ball joint assembly comprising a bearing seat having a surface of curvilinear configuration, a bearing journaled in said seat comprising a core and an outer resilient wall, annular connecting means for spacing and securing said outer wall to said core, said outer wall having a curvilinear surface of a radius of curvature in longitudinal cross section greater than the radius of curvature of said bearing seat, whereby said outer wall is compressibly received in said bearing seat and stressed for expansion into engagement therewith.

6. A ball joint assembly comprising a bearing seat having a bearing surface of curvilinear configuration, a double-walled bearing including an inner wall having a central shaft receiving opening, a shaft journaled within said inner wall, a resilient outer wall having an outer surface of curvilinear configuration with a radius of curvature greater than said bearing seat when unassembled, said outer wall being received in said bearing seat and deformed in compression to absorb dimensional differences, annular means connecting and spacing said inner and outer walls, said inner wall having circumferentially spaced, longitudinally extending fingers and means on said fingers for engaging said shaft to prevent longitudinal displacement of said shaft relative to said bearing.

References Cited by the Examiner

UNITED STATES PATENTS

| | | | |
|---|---|---|---|
| 454,742 | 6/1891 | Jordan | 16—23 X |
| 1,946,086 | 2/1934 | Lyman | 308—72 |
| 2,138,659 | 11/1938 | Kindig | 308—30 |
| 2,322,004 | 6/1943 | Fast | 308—72 X |
| 2,913,284 | 11/1959 | Zankl | 308—238 X |
| 3,115,375 | 12/1963 | Haller | 308—72 |

FOREIGN PATENTS 543,797  7/1957  Canada.

MARTIN P. SCHWADRON, *Primary Examiner.*

ROBERT C. RIORDON, DAVID J. WILLIAMOWSKY,
*Examiners.*

D. C. CHAMPION, R. F. HESS, *Assistant Examiners.*